G. A. BOYDEN.
LOAD BRAKE DEVICE.
APPLICATION FILED SEPT. 30, 1920.

1,400,656. Patented Dec. 20, 1921.

INVENTOR
GEORGE A. BOYDEN
BY *Wm. M. Cady*
ATTORNEY

UNITED STATES PATENT OFFICE.

GEORGE A. BOYDEN, OF ROLAND PARK, MARYLAND, ASSIGNOR TO THE WESTINGHOUSE AIR BRAKE COMPANY, OF WILMERDING, PENNSYLVANIA, A CORPORATION OF PENNSYLVANIA.

LOAD BRAKE DEVICE.

1,400,656.      Specification of Letters Patent.     Patented Dec. 20, 1921.

Application filed September 30, 1920. Serial No. 413,730.

*To all whom it may concern:*

Be it known that I, GEORGE A. BOYDEN, a citizen of the United States, residing at Roland Park, in the city of Baltimore and State of Maryland, have invented new and useful Improvements in Load Brake Devices, of which the following is a specification.

This invention relates to fluid pressure brakes, and more particularly to an empty and load brake.

It has heretofore been proposed to provide an empty and load brake in which a manually operated handle is provided at opposite sides of the car, the manipulation of which is adapted to set the empty and load brake apparatus either for empty or load braking, as desired.

The principal object of my invention is to dispense with the use of a separate operating handle and provide means controlled by the manipulation of the usual brake pipe angle cock for effecting the adjustment of the empty and load brake apparatus.

Figure 1:
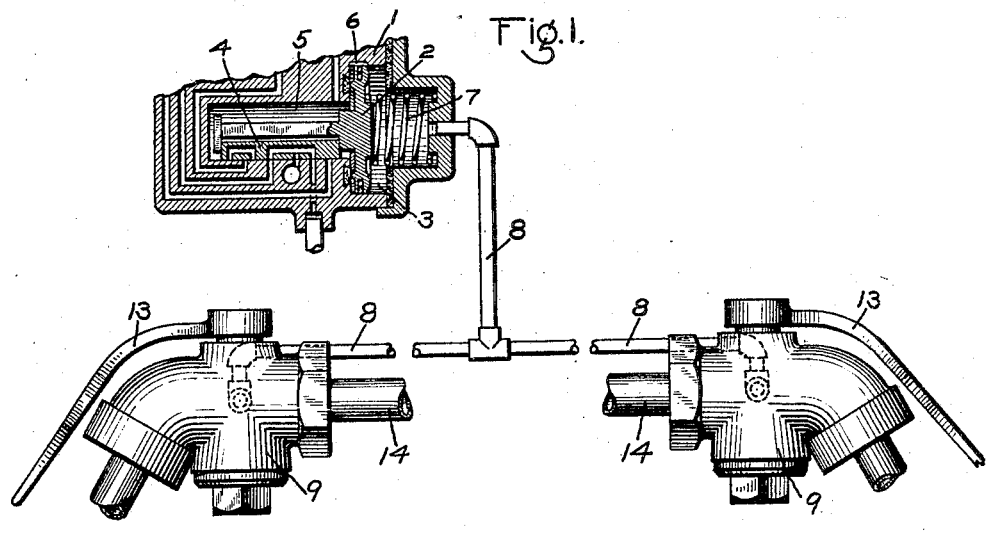
Figure 2:
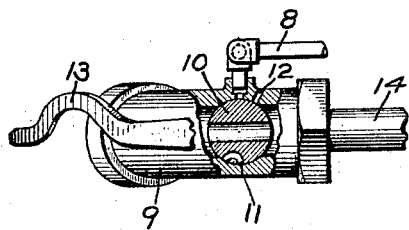

In the accompanying drawing; Figure 1 is a view illustrating the usual brake pipe angle cocks at opposite ends of a car and connected to a change-over valve of an empty and load brake equipment for adjusting same, in accordance with my invention; Fig. 2 a sectional view of a brake pipe angle cock adjusted to the position for empty car braking; and Fig. 3 a sectional view of an angle cock adjusted for loaded car braking.

The change-over valve 1 shown in Fig. 1 of the drawing is similar to the change-over valve shown in the prior Patent No. 1,131,967, of Walter V. Turner, dated March 16, 1915, and is employed for the purpose of adjusting the empty and load brake apparatus for either empty car or load braking and comprises a piston 2 contained in piston chamber 3 and a slide valve 4, contained in valve chamber 5 and adapted to be operated by piston 2.

In the patent construction, a manually operated valve is provided which in one position cuts off the piston chamber 3 from an atmospheric exhaust port, so that fluid pressure from the valve chamber 5 can equalize through a feed groove 6 to the piston chamber 3, thus permitting the spring 7 to hold the piston and slide valve in the empty position.

When the manually operated valve of the patent is opened, fluid under pressure is vented from the piston chamber 3 and the piston is then shifted to its outer load position.

According to my invention, the manually operated valve is dispensed with, and the piston chamber 3 is connected by a pipe 8 to each of the usual angle cocks 9 at opposite ends of the car.

The plug valve 10 of each angle cock is provided with a cavity 11 which is adapted in one position of the plug valve to connect the pipe 9 with an atmospheric exhaust port 12.

Figure 3:
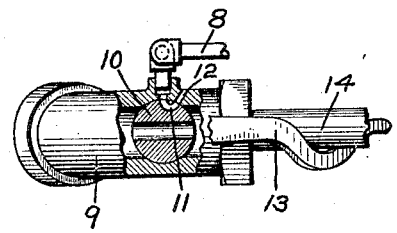

The handle 13 for operating the plug valve 10 is adapted to be moved to an additional position, as shown in Fig. 3 of the drawing, the handle being bent as shown so as to clear the brake pipe 14.

In operation, if the car is empty, the operator will turn the angle cock handles 13 to the usual open position, as shown in Fig. 1 and Fig. 2, in which the pipe 8 is blanked, so that in the change-over valve 1, fluid under pressure can equalize from the valve chamber 5 through feed groove 6 into the piston chamber 3 and the fluid pressures on opposite sides of piston 2 being equalized, the spring 7 maintains the piston 2 and slide valve 4 in empty position, as shown in Fig. 1.

If the car is loaded, the operator will turn the angle cock handle 13 to the rear or toward the car, as shown in Fig. 3 of the drawing, so that the pipe 8 is connected by cavity 11, with exhaust port 12.

Fluid under pressure is then vented from piston chamber 3 and the piston 2 with the slide valve 4 is shifted to the outer portion by fluid pressure in valve chamber 5, in which position, the change-over valve operates to set the empty and load brake apparatus for load braking.

It will now be seen that according to my invention, the empty and load apparatus may be adjusted for either empty or load braking by manipulation of the usual brake pipe angle cock, thus dispensing with the additional operating handle and lever connections heretofore employed.

The offset in the handle 13, provided for clearing the brake pipe, also serves to indicate to the trainmen that the car is equipped with empty and load brakes.

Having now described my invention, what I claim as new and desire to secure by Letters Patent, is:—

1. The combination with a valve device for adjusting empty and load brake apparatus for empty or load braking, of a brake pipe angle cock and means controlled by said angle cock for operating said valve device.

2. The combination with a valve device for adjusting empty and load brake apparatus for empty or load braking, of a brake pipe angle cock and means controlled by the manipulation of the angle cock for effecting the operation of said valve device.

3. The combination with a change-over valve device for controlling the adjustment of an empty and load brake apparatus for empty or load braking and having a piston operated by variations in fluid under pressure, of a brake pipe angle cock having means for controlling the fluid pressure on said piston.

4. The combination with a change-over valve device for controlling the adjustment of an empty and load brake apparatus for empty or load braking and having a piston normally subject on opposite sides to fluid under pressure, of a brake pipe angle cock having means for venting fluid from said piston in one position.

5. The combination with a change-over valve device for controlling the adjustment of an empty and load brake apparatus for empty or load braking and having a piston normally subject on opposite sides to fluid under pressure, of a brake pipe angle cock adapted in one position to open a port for venting fluid from said piston and in another position to close said port, the brake pipe being opened in both positions.

In testimony whereof I have hereunto set my hand.

GEORGE A. BOYDEN.